Jan. 8, 1963
R. HASTINGS, JR
3,072,169
RESILIENT WHEEL
Filed Dec. 28, 1959
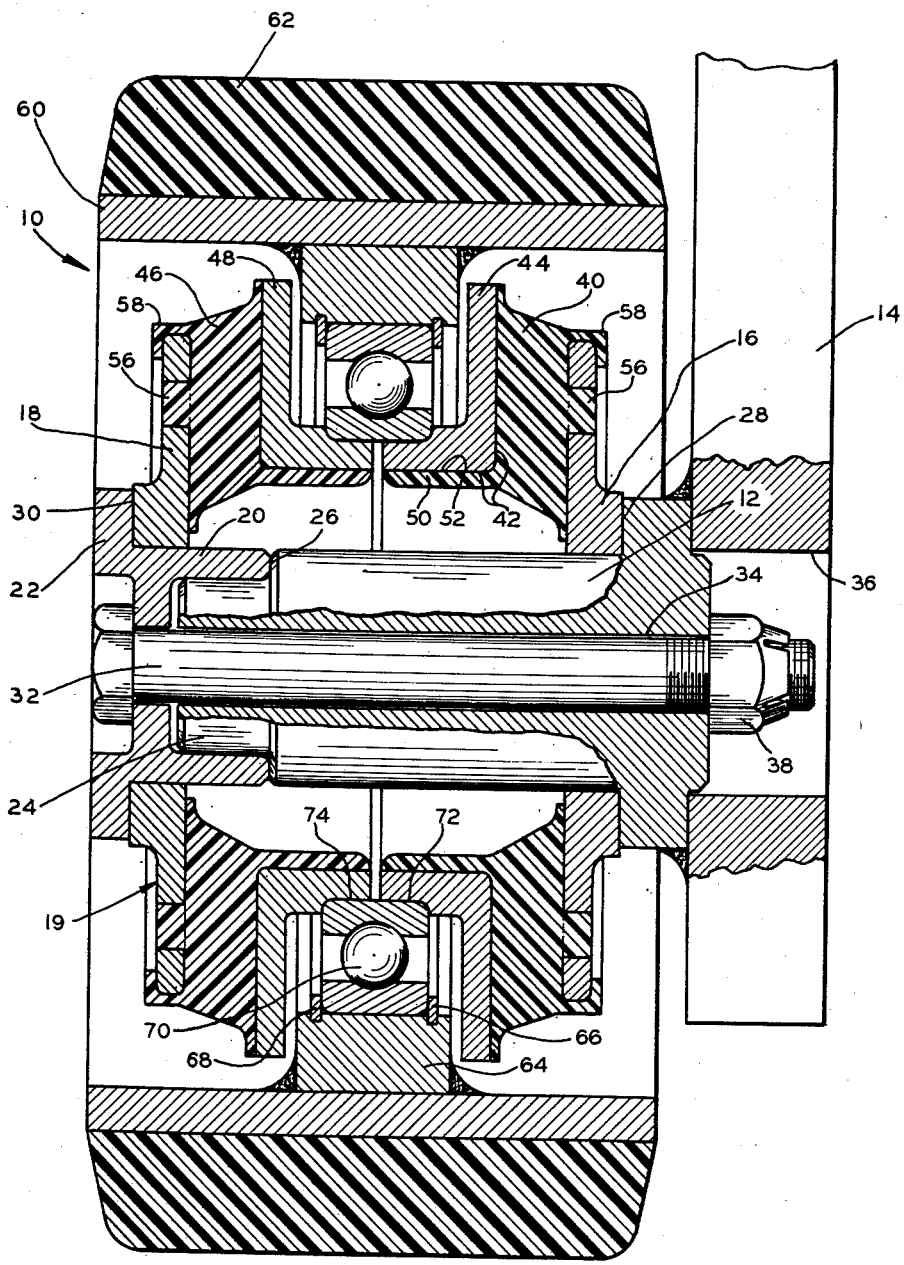
INVENTOR.
RUSSELL HASTINGS JR.
BY

United States Patent Office 3,072,169
Patented Jan. 8, 1963

3,072,169
RESILIENT WHEEL
Russell Hastings, Jr., Battle Creek, Mich., assignor to Clark Equipment Company, a corporation of Michigan
Filed Dec. 28, 1959, Ser. No. 862,283
17 Claims. (Cl. 152—41)

This invention relates to wheels and more particularly to a resiliently cushioned wheel.

In certain devices, such as industrial lift trucks of particular types, it has been found advantageous to use synthetic tires of relatively hard material, such as polyurethane, in preference to rubber tires. Polyurethane tires, for example, have less rolling resistance than rubber tires under a given load, and therefore somewhat less power is required to roll synthetically tyred wheels on a given surface than is required with rubber tyred wheels. Such reduction in power requirements is of special importance in battery powered vehicles, such as electrically powered lift trucks, inasmuch as battery energy is thereby conserved.

It has also been found that synthetic tires of certain types are capable of handling substantially larger loads than rubber tires of the same size. In the use of lift trucks in warehousing operations, for example, each inch of aisle width which can be added to storage space by reducing the aisle space required for operating the truck is of substantial value. The availability of a tire of given capacity but substantially less width than heretofore can save substantial amounts of costly warehouse space in permitting the use of narrower aisles between rows of stored material. One type of lift truck for which the present invention is especially well adapted is that disclosed in my co-pending U.S. application Serial No. 818,869, filed June 8, 1959.

However, certain disadvantages inhere in the use of such relatively hard, high capacity tires which it is the purpose of the present invention to overcome. The paramount disadvantage is the relatively "hard" ride experienced by an operator of the vehicle. Also, the shock loadings imposed on the axle and other parts in running the wheel over a rough surface tend to be relatively high in comparison with the shock loadings experienced in the use of a rubber tired wheel.

I have invented a wheel construction which is capable of being used with a relatively hard tire material, such as polyurethane, which practically eliminates the above disadvantages while retaining the advantages attendant in the use of such tires.

In order to accomplish this result, I provide generally a wheel construction having a rim portion rotatable on bearing means which is mounted on a fixed mounting assembly; the mounting assembly includes nonrotatable resilient means loadable in shear upon the application of a load on the wheel.

Use of the hard tire material is compensated by means of the resilient mounting of the rim relative to the fixed mounting assembly so that essentially the same riding "feel" is experienced by an operator as with rubber tired wheels. By designing a wheel as aforesaid with non-rotating resilient support means loadable only in shear, unit loading of the resilient means under a given load is minimized while the amount of available deflection or resilience between the rim and mounting assembly tends to be maximized. Also, in using the resilient means as a fixed or non-rotating part of the construction a loss of energy in the form of heat is avoided which would occur as a result of hysteresis if the resilient means were a rotating part of the wheel construction. An additional advantage in the use of such hard tires in a truck of the type described, for example, in the aforementioned co-pending application is that the tire deflects under high load to a positive limit of travel, thus providing a stable support for the truck at all times. By contrast, conventional rubber tires do not reach any positive limit of compression under load and, therefore, do not provide as good stability.

It is a primary object of the present invention to generally improve upon resiliently cushioned wheel constructions.

Another important object of the invention is to provide an improved wheel construction wherein the rotating portion of the wheel is supported upon the non-rotating portion thereof by non-rotating resilient means to minimize hysteretic loss.

Another object of the invention is to provide an improved wheel construction of the type contemplated wherein non-rotating resilient means is loadable in shear alone.

Other objects and advantages of the invention will readily appear to persons skilled in the art from the following detailed description taken in conjunction with the single figure which illustrates my wheel and tire construction in cross-section.

Referring now in detail to the drawing, the wheel construction which is illustrated generally at numeral 10 is a non-driven type. An axle portion 12, shown partly in section, is secured rigidly, as by welding, to a wheel mounting member 14, such as would be provided in vehicles of certain types. A pair of axially spaced flange members 16 and 18, which comprise outer portions of the wheel mounting assembly designated generally at numeral 19, are slidably mounted upon the axle 12 and an axially extending annular portion 20 of a retainer member 22, respectively. The annular portion 20 of the retainer 22 is slidably associated with a reduced diameter end portion 24 of the axle 12 and abuts a shoulder 26 when the wheel assembly is axially pre-loaded in compression, as will be described hereinafter. Outer wheel mounting members 16 and 18 are retained between shoulders 28 and 30 of axle 12 and retainer 22, respectively, and are maintained in position when the wheel is assembled by means of an axle bolt 32 which is inserted through an opening 34 in the axle 12 and retainer 22 and which extends into an opening 36 of member 14. A nut 38 secures the entire wheel mounting assembly in predetermined compression, when retainer portion 20 abuts shoulder 26.

Annular member 16 has securely bonded thereto an axially inwardly and radially outwardly extending resilient member or shearing ring 40 which may be of rubber or other suitable material. The opposite side of resilient member 40 is securely bonded to surfaces of an inner annular wheel mounting member and bearing retainer 44. A second annular resilient member of shear ring 46 is disposed in opposed facing relationship to member 40, being bonded to outer mounting member 18 and to a second inner annular wheel mounting member and bearing retainer 48.

Preferably, resilient members 40 and 46 are formed in a shape somewhat as shown to provide a relatively large bonding area with the mounting members to which each is connected. For instance, each of the resilient members includes an annular extension 50 which is bonded to the inner annular surface 52 of each inner mounting member. Also, it is preferred that each resilient member be connected to its respective outer mounting member not only on the inner vertical surface thereof, but that it include annular projections 56 and 58 which are bonded and conform to respective portions of each of the outer mounting members, as illustrated. It will be understood that the particular form of each resilient member described herein is subject to considerable variation depending upon the application and requirements of the user.

The rim of the wheel is formed of a cylindrical member 60 to which is bonded a tire 62, preferably of a hard synthetic material such as polyurethane. Radially inwardly and centrally of the rim is secured, as by welding, a ring 64 having formed on the inner periphery thereof a pair of axially spaced grooves for receiving a pair of snap rings 66 and 68. A roller bearing 70 is located axially intermediate snap rings 66 and 68 and radially intermediate the ring 64 and annular grooves 72 and 74 formed in one surface of mounting members 44 and 48.

The wheel is assembled by first sliding right hand mounting unit 16, 40, 44 along the shaft 12 to the position shown wherein portion 16 abuts shoulder 28 of the axle. The wheel rim and bearing 60 and 70 preferably comprise a sub-assembly which is next located in the position shown in the drawing. Left hand mounting unit 18, 46, 48 is preferably then located on annular portion 20 in abutment with shoulder 30, following which retainer 22 is mounted upon section 24 of the shaft so that groove 74 is located in cradling relation to the one side of bearing 70. Axle bolt 32 is next inserted through openings 34 and 36 and nut 38 tightened to precompress mounting assembly 19 a predetermined amount, which amount is automatically fixed when retainer portion 20 abuts shoulder 26, as aforesaid. Thus, resilient members 40 and 46 sustain a predetermined compression loading; all parts of the wheel assembly are thus maintained in fixed relative axial position.

In this wheel construction rim assembly 60, 64 (with tire 62 bonded thereto and snap rings 66 and 68 held thereto) is the only part which rotates; it rotates on the outer race of bearing 70. It will be observed that the resilient members 40 and 46 are mounted in the respective wheel mounting assemblies to function as shear rings, i.e., to resist solely in shear all loading forces which are imposed upon the wheel.

As discussed hereinbefore, substantial functional advantages are present in this invention which do not appear in prior constructions. One aspect of the construction which merits some additional discussion is the manner in which shear rings 40 and 46 are mounted as parts of the non-rotating mounting assemblies of the wheel. Hysteretic losses which would occur in operation if the shear rings were mounted for rotation with the wheel rim are avoided by this construction. This fact will be understood upon consideration that a rotating resilient means would be subject to continuing flexure varying in degree as a function of the speed of wheel rotation. Such flexure, as is well known to persons skilled in the art, causes hysteresis in the part, thereby producing heat energy which is dissipated without performing useful work. In the present construction it will be observed that the non-rotating shear rings are flexed only when a load is applied to the wheel, and that on a smooth floor, for example, little or no flexure may occur in addition to that induced initially upon the application of load. No flexure results from wheel rotation per se.

Although I have described and illustrated a preferred embodiment of my invention, it will be understood by those skilled in the art that modifications may be made in the form and arrangement of parts without departing from the spirit and scope of the invention. Accordingly, it should be understood that I intend to cover by the appended claims all such modifications which fall within the scope of my invention.

I claim:

1. A resilient wheel comprising an axle member, mounting means supported from said axle member having first and second annular axially spaced portions, an axle retainer member secured at one end of the axle member for supporting one of said mounting portions and maintaining a fixed axial spacing of said first and second portions, said axle and axle retainer members together comprising axle means, said mounting means being non-rotatable and each portion thereof including resilient shear rings, bearing means axially intermediate said first and second portions, and rim means mounted upon said bearing means for rotation radially outwardly of the mounting means.

2. A resilient wheel as claimed in claim 1 wherein a synthetic tire of relatively hard material is secured to the outer periphery of the rim means, and said shear rings afford resilient mounting of the rim and tire upon the axle means, said shear rings being constructed and arranged to receive in shear substantially all of the forces applied to the tire and rim.

3. A resilient wheel comprising cantilever axle means, rotatable rim means, and non-rotatable mounting means disposed laterally and radially within the rim means and supporting the rim means upon the axle means, said mounting means including a pair of axially spaced annular resilient members receiving in shear substantially all normal forces applied to the rim means during rotation of the rim means.

4. A resilient wheel as claimed in claim 1 wherein said axle retainer member includes axially and radially extending bearing surfaces for abutting corresponding surfaces of one of said mounting portions, said axially extending bearing surface having a diameter substantially equal to the diameter of said axle member.

5. A resilient wheel as claimed in claim 1 wherein said first and second annular axially spaced portions together include an annular portion of generally U-shaped cross-section supporting said bearing means.

6. A resilient wheel comprising an axle member, a retainer member registrable with a portion of said axle member and forming therewith axle means, holding means extending axially through said axle means for maintaining said retainer and axle members in fixed relation, first and second non-rotatable axially spaced mounting means extending radially outwardly of said axle means and supported at opposite end portions thereof, each said first and second mounting means including an annular resilient shear member, bearing means supported on said first and second mounting means, and rotatable rim means mounted on said bearing means.

7. A resilient wheel as claimed in claim 6 wherein said first and second mounting means are located laterally within said rim means, said retainer member being adjustable on said axle member to precompress said resilient shear means a predetermined amount.

8. A resilient wheel as claimed in claim 6 plus wheel mounting means supporting said axle means from one end only therefo.

9. A resilient wheel comprising a rotatable annular rim having securely bonded peripherally thereof a tire of relatively hard synthetic material, axle means, mounting means supporting said axle means, and annular non-rotatable mounting means located laterally inwardly of said rim and supporting the rim upon the axle means, said annular mounting means including an axially spaced pair of radially extending outer mounting portions, an axially spaced pair of radially extending inner mounting portions and a shear ring of resilient material securely bonded to opposed surfaces of adjacent elements of said inner and outer pairs of mounting portions for receiving in shear forces applied to said rim and tire.

10. A resilient wheel comprising a rotatable annular rim having securely bonded peripherally thereof a tire of relatively hard synthetic material, axle means, mounting means supporting said axle means, and annular non-rotatable mounting means located laterally inwardly of said rim and supporting the rim upon the axle means, said annular mounting means including an axially spaced pair of radially extending outer mounting portions supported from the axle means, an axially spaced pair of radially extending inner mounting portions located axially intermediate of the outer mounting portions and a shear ring of resilient material securely bonded to opposed surfaces of adjacent elements of said inner and outer pair of mounting portions for receiving in shear forces applied to said rim and tire.

11. A resilient wheel as claimed in claim 10 wherein bearing means is located radially intermediate a portion of the inner mounting portion and the rim means for supporting said rim means for rotation about said annular mounting means.

12. A resilient wheel comprising non-rotatable axle means having a pair of axially separable parts, rim means mounted for rotation about said axle means, non-rotatable mounting means located within said rim means, supported from said axle means and supporting said rim means, said mounting means including a pair of axially spaced annular resilient members, and a wheel holding member extending through said axle means for actuating said pair of axle parts into abutting relation in order to subject said resilient members to a predetermined amount of compression.

13. A resilient wheel comprising an axle member, mounting means supported from said axle member having first and second annular axially spaced portions, an axle retainer member secured at one end of the axle member for supporting one of said mounting portions and maintaining a fixed axial spacing of said first and second portions, said axle and axle retainer members together comprising axle means which is axially separable upon disassembly of the wheel, said mounting means being non-rotatable and each said portion thereof including resilient shear rings, a holding member extending axially through said axle means for causing a portion of said axle retainer member to abut a portion of said axle member in order to precompress said resilient shear rings a predetermined amount, bearing means axially intermediate said first and second portions, and rim means mounted directly upon said bearing means and rotatable upon said bearing means radially outwardly of said mounting means.

14. A resilient wheel comprising a rotatable annular rim having securely bonded peripherally thereof a tire of relatively hard synthetic material, axle means, mounting means supporting said axle means, annular non-rotatable mounting means located laterally inwardly of said rim and supporting the rim upon the axle means, said annular mounting means including an axially spaced pair of radially extending outer mounting portions, an axially spaced pair of radially extending inner mounting portions and a shear ring of resilient material securely bonded to opposed surfaces of adjacent elements of said inner and outer pair of mounting portions for receiving in shear forces applied to said rim and tire, and means associated with said axle means to produce a predetermined compression in said resilient shear rings.

15. A resilient wheel comprising an axle member, a retainer member registrable with a portion of said axle member and forming therewith axle means, holding means extending axially through said axle means for maintaining said retainer and axle members in fixed relation, first and second non-rotatable axially spaced mounting means extending radially outwardly of said axle means and supported at opposite end portions thereof, said first mounting means abutting radially and axially extending surfaces of said axle member, said second mounting means abutting radially and axially extending surfaces of said retainer member, each said first and second mounting means including an annular resilient shear member, said holding means being adjustable to actuate said retainer member axially of said axle member a predetermined amount for producing precompression of said resilient shear members, bearing means supported on said first and second mounting means, and rotatable rim means mounted on said bearing means, said first and second mounting means being located laterally within said rim means.

16. A resilient wheel comprising non-rotatable axle means, rim means mounted for rotation about said axle means, and non-rotatable mounting means located radially and axially within said rim means, supported from said axle means and supporting said rim means, said mounting means including axially spaced resilient members receiving in shear substantially all normal forces applied to the rim means during rotation of the wheel.

17. A resilient wheel comprising an axle, mounting means supporting the axle from one end only, a rotatable outer rim, non-rotatable mounting means supported by the axle including annular means formed of resilient material, said resilient annular means being adapted to receive in shear forces applied to the rim and being mounted so as to minimize hysteretic loss therein during rotation of the rim, and bearing means supported by said non-rotatable mounting means and supporting said rim, said non-rotatable mounting means and said bearing means being located axially and radially within said rim.

References Cited in the file of this patent

UNITED STATES PATENTS

| | | |
|---|---|---|
| 2,272,270 | Krotz | Feb. 10, 1942 |
| 2,433,789 | Searles et al. | Dec. 30, 1947 |
| 2,669,448 | Cushman | Feb. 16, 1954 |
| 2,902,072 | Reuter | Sept. 1, 1959 |
| 2,906,312 | Feedlander | Sept. 29, 1959 |
| 2,912,034 | Mattern et al. | Nov. 10, 1959 |

FOREIGN PATENTS

| | | |
|---|---|---|
| 174,257 | Austria | Mar. 10, 1953 |